Aug. 5, 1969 D. TANN 3,458,889

INTERMITTENT WINDSHIELD WIPER CLEANING SYSTEM

Filed April 8, 1966 2 Sheets-Sheet 1

INVENTOR
David Tann

BY Lane, Aitken, Dunner & Ziems
ATTORNEYS

INVENTOR
David Tann

BY
Lane, Aitken, Dunner & Ziems
ATTORNEYS

United States Patent Office 3,458,889
Patented Aug. 5, 1969

3,458,889
INTERMITTENT WINDSHIELD WIPER CLEANING SYSTEM

David Tann, 333 Covington Drive, Detroit, Mich. 48203

Filed Apr. 8, 1966, Ser. No. 541,152
Int. Cl. A47l 1/02; B60s 1/08
U.S. Cl. 15—250.12 7 Claims

ABSTRACT OF THE DISCLOSURE

A control device for activating a windshield wiper motor unit intermittently with a dwell period at the end of each wiping cycle. The moisture on the windshield is sensed while a wiping cycle is in progress and the amount of moisture sensed is used to control the length of time of the succeeding dwell period, the length of time of the dwell periods varying inversely with the moisture on the windshield.

The present invention relates to windshield wiper cleaning systems and more particularly to a control device for operating a windshield wiper cleaning system intermittently with variable dwell periods at the end of each wiping cycle.

In accordance with a preferred embodiment of the invention an electric wiper motor unit having an electric motor is provided for driving windshield wiper blades through repeating wiping cycles. The motor unit is automatically deenergized by a control device at the end of each wiping cycle for a dwell period which varies in accordance with the load on the wiper motor unit during the preceding wiping cycle. As the load increases in response to increased drag encountered by the wiper blades moving across a drier windshield, the dwell periods automatically increase in length, and when the load on the wiper motor unit decreases when the wiper blades are operating over a wetter windshield, the dwell periods decrease. In this manner, the number of wiping cycles per unit time automatically increases in response to increased moisture on the windshield and decreases when the moisture on the windshield decreases.

The control device, in accordance with one embodiment of the invention, measures the integral of the load on the wiper motor unit over substantially an entire wiping cycle and employs this information to determine the length of time of the dwell period at the end of the wiping cycle. More specifically, since the speed of an electric wiper motor unit varies inversely with the load on the motor, the length of time of each wiping cycle increases as the load increases and decreases as the load decreases. The length of time of each wiping cycle is measured and this information is employed to produce a dwell period which increases as the length of time of the preceding wiping cycle increases and decreases as the length of time of the preceding wiping cycle decreases.

Accordingly it is one object of the invention to provide a windshield wiper cleaning system which operates intermittently with a dwell period at the end of each wiping cycle with the length of time of the dwell period varying in accordance with the load on the wiper motor unit.

It is another object of the invention to provide a windshield wiper cleaning system of the type described above where the length of time of each dwell period varies in accordance with the length of time of the preceding wiping cycle.

It is a further object of the invention to provide an electronic control for a windshield wiper cleaning system of the type described above which employs a transistor biased ON and OFF by an RC time constant in a manner to control the length of time of the dwell periods at the end of each wiping cycle wherein the capacitor of the RC time constant is charged at a predetermined rate during substantially an entire wiping cycle and the magnitude of charge on the capacitor determines the OFF time of the transistor during the dwell period following the wiping cycle.

Other objects and features of novelty of the present invention will be specifically pointed out or will otherwise become apparent when referring for a better understanding of the invention, to the following description taken in conjunction with the accompanying drawings, wherein.

Figure 1:
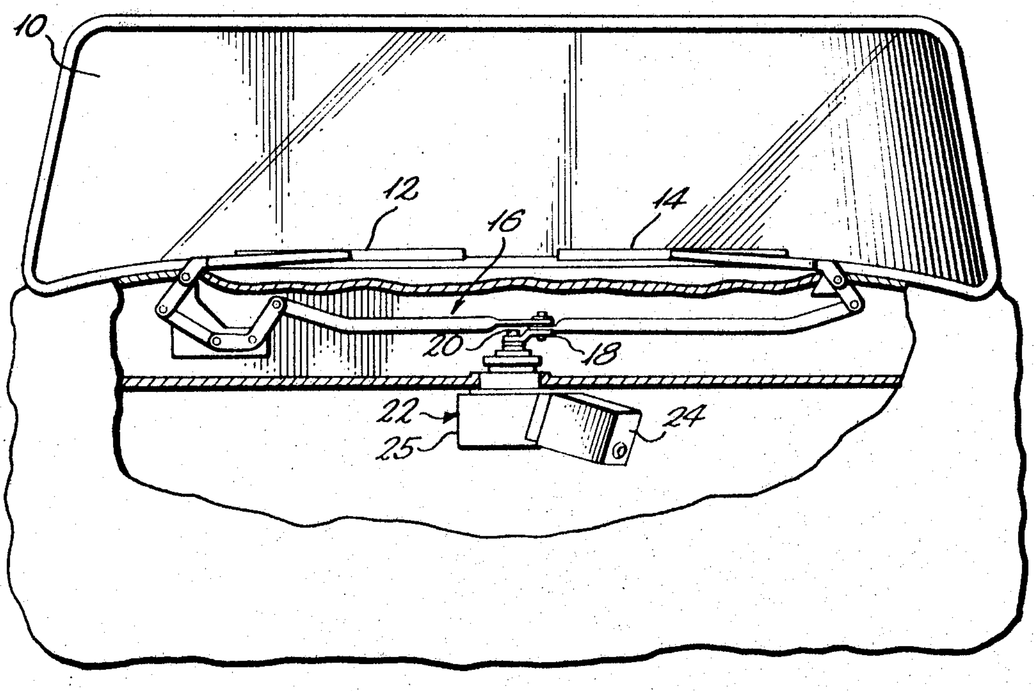
FIG. 1 is a fragmentary front view, partially broken away, of an automotive vehicle, illustrating the windshield wiper cleaning system thereof.

Referring to FIG. 1 a windshield 10 of an automotive vehicle is illustrated having conventional wiper blades 12 and 14 for cleaning the windshield. The wiper blades are oscillated back and forth by a conventional linkage system 16 driven by a crank arm 18 which, in turn, is roated by an output shaft 20 of a conventional wiper motor unit 22 including an electric motor 24 and speed reducer unit 25. The output shaft 20 rotates one complete revolution for each complete wiping cycle. The wiping cycles start from the park position illustrated and comprise an upstroke and a return stroke back to the park position.

Figure 2:
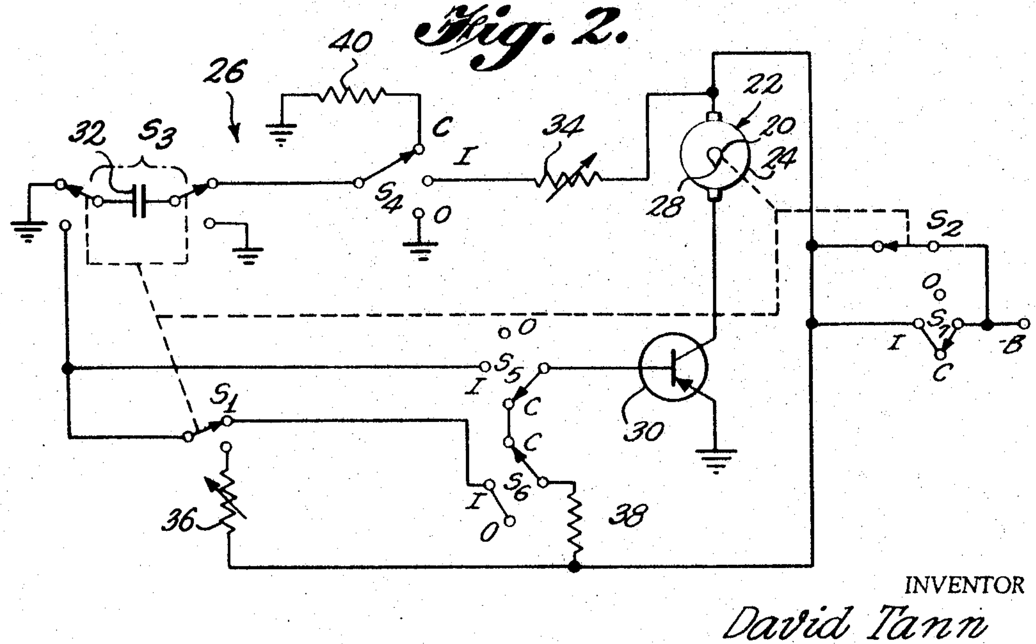
FIG. 2 is a schematic diagram of a control device for controlling the wiper motor unit of the windshield cleaning system illustrated in FIG. 1.

Referring to FIG. 2 a control device 26 is illustrated for controlling the operation of the electric motor 24 of the wiper motor unit 22. The wiper motor unit 22 is illustrated schematically in FIG. 2 along with its output shaft 20. The output shaft 20 has a cam 28 thereon for shifting single pole double through switches S1–S3 at the end of each wiping cycle from the positions illustrated to their other positions. The cam 28 maintains the switches S1–S3 in their other positions for several degrees of rotation of the output shaft 20 after which the switches return to and remain in the positions illustrated in FIG. 2 until the end of the next wiping cycle.

The emitter-collector circuit of a transistor 30 is connected between ground and one side of the motor 24 of the wiper motor unit 22. The other side of the wiper motor is connected to the negative terminal —B of the vehicle battery through either switch S2 or switch section S7 which is connected in parallel with the switch S2. The switch section S7 is a part of a mode switch preferably mounted on the dashboard of the vehicle in position to be controlled by the driver. The mode switch has four switch sections S4–S7 with each of the sections having an OFF position O, an intermitted position I, and a continuous position C.

Switch S3 actually comprises a pair of single pole double throw switches with a capacitor 32 connected between the movable contacts of the switch S3. A variable resistor 34 is connected to the negative side of the wiper motor 24 and the intermittent contact of the switch section S4. A variable resistor 36 is connected between the stationary contact of the switch S1 which is energized at the end of a wiping cycle and the negative terminal —B through the switch S2 or switch section S7. A resistor 38 is connected between the movable contact of the switch section S6 and the negative terminal —B through the switch S2 or switch section S7. The base of the transistor 30 is connected to the movable contact of the switch section S5 with the intermittent contact of the switch section S5 being connected between the movable contact of the switch S1 and one of the stationary contacts of the switch S3.

In operation, when the operator turns the mode switch on the dashboard to the continuous position, each of the movable contacts of the switch sections S4–S7 engage their contact C as illustrated in FIG. 2. In this position the base of the transistor 30 is connected to the negative terminal —B through the switch sections S5, S6, resistor 38 and switch section S7 so that the transistor 30 is ON to energize the motor 24 continuously without interruption. Therefore, the wiper blades operate continuously without a dwell period at the end of each wiping cycle as long as the mode switch remains in the continuous position.

When the moisture on the windshield decreases so that continuous operation of the wiper blades is not required, the operator can turn the mode switch to the intermittent position to produce intermittent operation with a dwell period at the end of each wiping cycle. In this position each of the movable contacts of the switch sections S4–S7 engage their middle contact I, and the base of the transistor 30 is connected to the negative terminal —B through the switch section S5, the switch S1, the switch section S6, the resistor 38 and the switch section S7. This turns the transistor ON and energizes the motor 24 to start a wiping cycle. During the wiping cycle the left side of the capacitor 32 is connected to ground by the switch S3 as illustarted and the right side of the capacitor is connected to the variable resistor 34 by the switch section S4. Since the variable resistor 34 is connected to the negative terminal —B through the switch section S7, the capacitor 32 charges during the wiping cycle. The magnitude of the charge is proportional to the length of time of the wiping cycle. Experience has shown that a wiping cycle is an automotive vehicle having an electric wiper motor takes about one second for a very wet windshield and, as the moisture on the windshield decreases, the length of time of the wiping cycle increases. This is particularly true of, and the invention is particularly suited for use with, the relatively inexpensive permanent magnet electric motors used on many automobiles today. The length of time of a wiping cycle for these motors increases well over 50% when the wiper blades operate over a substantially dry windshield.

At the end of the wiping cycle the cam 28 on the output shaft 20 of the wiper motor unit cams the movable contacts of the switches S1 and S3 to their other contacts. This connects the right side of the capacitor 32 to ground and the left side of the capacitor to the juncture between the movable contact of the switch S1 and the intermittent contact of the switch section S5. Since the charge across the capacitor cannot change instantaneously the potential of the intermittent contact of the switch section S5 and thus the potential of the base of the transistor 30 becomes positive by an amount equal to the amount the capacitor was charged during the preceding wiping cycle. This positive potential immediately biases the transistor 30 OFF to deenergize the wiper motor unit 22 for a dwell period. During the dwell period the capacitor 32 discharges through the variable resistor 36. When it discharges sufficiently to remove the positive bias from the base of the transistor, the transistor 30 automatically turns back ON to start the next wiping cycle. After a few degrees rotation of the output shaft 20, the cam 28 trips the movable contacts of the switches S1 and S3 back to the position illustrated in FIG. 2 so as to recharge the capacitor 32 during the wiping cycle.

This mode of operation repeats itself with a dwell period at the end of each wiping cycle. The length of time each dwell period varies in accordance with the charge on the capacitor which, in turn, is determined by the length of time of the preceding wiping cycle which, in turn, varies in accordance with the load on the wiper motor unit. The speed of the motor decreases when the load increases so that the length of time of the wiping cycle increases. Therefore the charge on the capacitor at the end of a wiping cycle is an integral of the load on the motor during the wiping cycle.

By selecting the proper values for the elements of the circuit, the dwell periods can be made to vary from less than one second to more than ten seconds. By adjusting the variable resistors 34 and 36, the gate at which the capacitor 32 charges during a wiping cycle and discharges during the dwell period can be controlled to produce the desired dwell periods for given windshield conditions.

When the driver turns the mode switch on the dashboard to the OFF position to deactive the wiper blades, the movable contacts of the switch sections S4–S7 engage their contacts O. The wiper blades complete the wiping cycle in progress since the base of the transistor 30 is connected to the negative terminal —B through the switch section S5, the switch S1, the switch section S6, the resistor 38 and the switch S2. Since the switch section S7 is on its contact O, the circuit to the negative terminal —B cannot be completed through this switch section as in the continuous and intermittent positions. At the end of the wiping cycle in progress, the switch S2 is cammed open by the cam 28 to break the connection to the negative terminal —B. This deenergizes the transistor 30 and wiper motor unit 22 to stop the wiper blades at the park position. The wiper blades will remain at this park position as illustrated in FIG. 1 until the driver turns them back on by switching the dashboard mode switch to the intermittent or continuous positions previously described.

The resistor 40 is provided as a precaution to avoid having the continuous contact of the switch section S4 connected directly to ground. It will be observed that, in the continuous position, the capacitor 32 will not charge during the wiping cycle, but during the several degrees of rotation wherein the cam 28 maintains the switches S1 and S3 tripped at the end of a wiping cycle, the capacitor 32 can charge a small amount since one side is connected to ground and the other side is connected to the negative terminal —B through the switch S1 and the variable resistor 36. Therefore when the switch S3 returns during the next wiping cycle to the position illustrated, the small charge on the capacitor can be dissipated through the resistor 40 to ground in a manner to avoid arching at the contacts.

Figure 3:
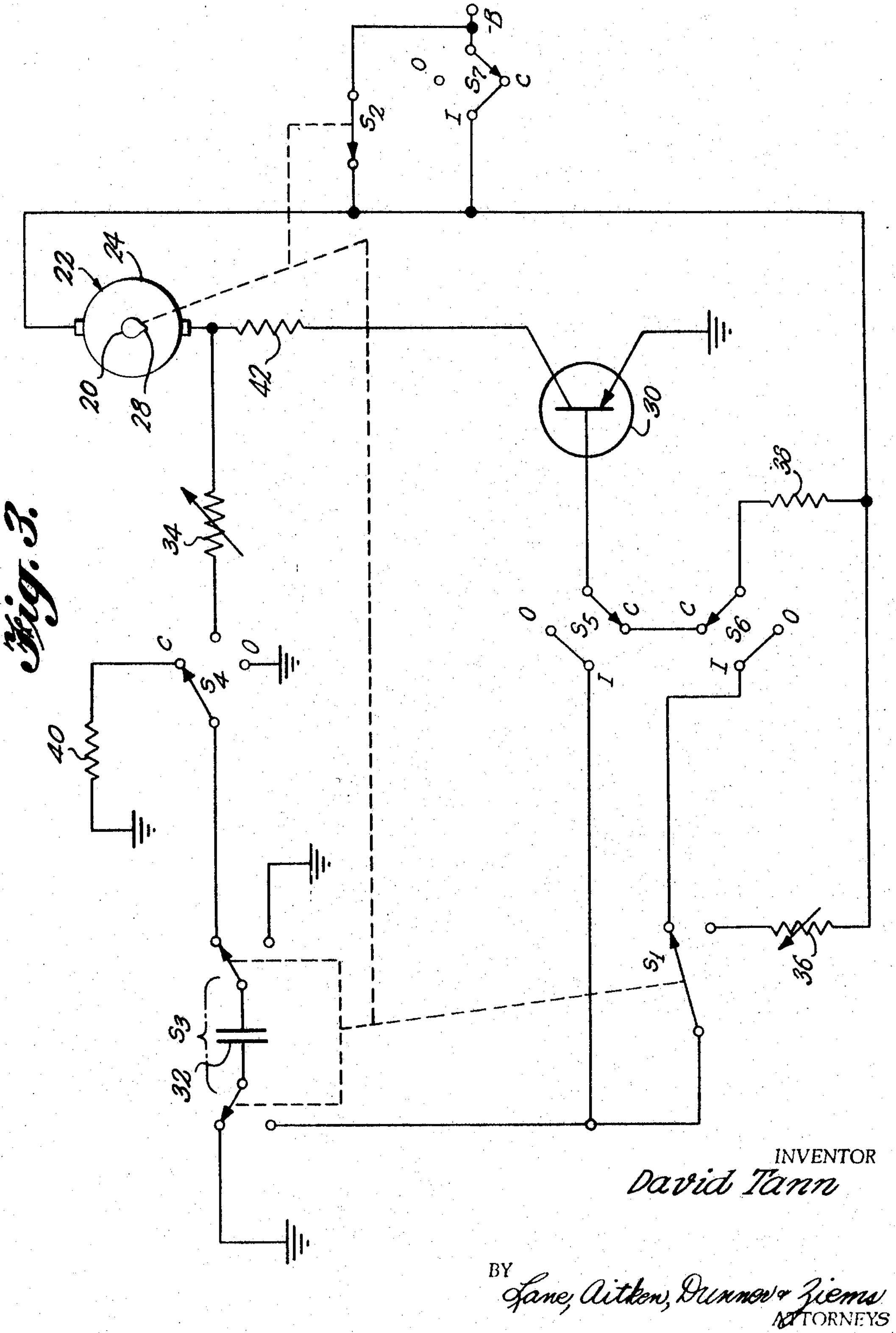
FIG. 3 is a schematic diagram similar to FIG. 2 illustrating another embodiment of the invention.

Referring to FIG. 3 another embodiment of the invention is illustrated which is identical to the embodiment just described with the exception that an additional resistor 42 is provided between the transistor 30 and the wiper motor unit 22 and the variable resistor 34 is connected between the resistor 42 and the wiper motor unit. With this change the charge on the capacitor 32 will vary in accordance with the current applied to the electric motor 24 of the wiper motor unit 22, as well as, the length of time of the wiping cycle. In the embodiment of FIG. 2, the variable resistor 34 was connected directly to the negative terminal —B of the battery which provides a substantially constant voltage. Therefore the the charge on the capacitor varied only in accordance with the time on the motor. The current drawn by an electric wiper motor varies significantly with the load imposed on the motor by the drag of the wiper blades on the windshield. The motor current can vary from a few amps when the wiper blades are operating over a very wet windshield to 6–12 amps when the wiper blades are operating over a substantially dry windshield.

In all other respects the embodiment of FIG. 3 operates in the same manner as the embodiment of FIG. 2. When the wiper blades ar operating over a very wet windshield such as in a heavy downpour, the drag on the wiper blades will be at a minimum, the current drawn by the the motor will be at a minimum, and the length of time for a complete wiping cycle will be at a minimum. Therefore the capacitor 32 will be charged its minimum amount. When the wiper blades are operating over a substantially dry windshield the current required by the motor will increase significantly and the length of time of the wiping cycle will increase so that the capacitor 32 will be charged over a longer period of time by a larger current.

The invention claimed is:

1. In a windshield wiper cleaning system, a wiper motor unit having an electric motor for driving said system through repeating wiping cycles, and control means for activating said wiper motor unit intermittently with a dwell period at the end of each wiping cycle which dwell period varies in accordance with the load on said wiper motor unit, said control means comprising means for de-energizing said wiper motor unit at the end of each wiping cycle, and timing means for energizing said wiper motor unit after said dwell period to start another wiping cycle, said timing means including means for measuring the integral of the load on said wiper motor unit over at least a portion of a wiping cycle and setting the dwell period in accordance with the integral measured during the wiping cycle, said measuring means including resistor means connected in series with said electric motor for producing a voltage signal proportional to the motor current, and means for integrating said voltage signal during each wiping cycle.

2. The invention as defined in claim 1 wherein said integrating means includes a capacitor and means connecting said capacitor to the voltage signal during each wiping cycle in a manner to vary the charge on said capacitor at the end of each cycle in accordance with the load on said wiper motor unit.

3. The invention as defined in claim 2 wherein said control means includes an electronic valve, means biasing said valve to a second condition at the end of each wiping cycle in a manner to deenergize said wiper motor unit and to subsequently bias said valve to a first condition to energize said wiper motor unit, said biasing means including means for connecting said capacitor to said electronic valve at the end of each wiping cycle to bias said electronic valve to said second condition until said capacitor discharges a sufficient amount to bias said electronic valve to said first condition.

4. The invention as defined in claim 3 wherein said electronic valve compirses at least one transistor having the emitter and collector thereof connected in series with said wiper motor and wherein said capacitor is connected to the base of said transistor at the end of each wiping cycle whereby the transistor is biased to said second condition until the capacitor discharges sufficiently to bias said transistor to said first condition.

5. The invention as defined in claim 3 including a resistor having one end connected to said signal voltage, and switch means for connecting said capacitor to the other end of said resistor during substantially an entire wiping cycle in a manner to charge said capacitor through said resistor and disconnecting said capacitor from said resistor and connecting said capacitor to said electronic valve at the end of each wiping cycle in a manner to maintain said electronic valve biased to said second condition until the capacitor discharges sufficiently to bias the electronic valve to said first condition.

6. The invention as defined in claim 1 wherein said control means comprises an energizing circuit for connecting said wiper motor to said resistor means and a voltage source, a transistor having the emitter collector circuit thereof connected in said energizing circuit in a manner to energize said wiper motor unit when the transistor is in a first condition and deenergize said wiper motor unit when it is in a second condition, a resistance having one end thereof connected to said signal voltage, a capacitor, a second resistance having one end thereof connected to said energizing circuit, and switch means for connecting the other end of said second resistance to the base of said transistor to bias said transistor to said first condition during substantially an entire wiping cycle, said switch means connecting said capacitor to the other end of said first resistance means during substantially an entire wiping cycle in a manner to charge the capacitor through the first resistance means and connecting said charged capacitor to the base of said transistor at the end of each wiping cycle in a manner to bias said transistor to said second condition until said capacitor discharges a sufficient amount to bias said transistor back to said first condition.

7. The invention as defined in claim 6 wherein said switch means comprises manually controlled mode switch means having an OFF position, an intermittent position, and a continuous position, and second switch means responsive to the position of said wiper motor unit for connecting said capacitor to the other end of said first resistance during a wiping cycle and to the other end of said second resistance during a small angle at the end of each wiping cycle, said mode switch means when in said continuous position connecting said base to the other end of said second resistance without connecting said capacitor thereto at the end of each wiping cycle so that said transistor is continuously maintained in said first condition to produce repeating wiping cycles without dwell periods, said mode switch means when in said OFF position maintaining said transistor in said first condition for the remainder of the wiping cycle in progress and automatically deenergizing said wiper motor unit at the end of the wiping cycle.

References Cited

UNITED STATES PATENTS

| | | | |
|---|---|---|---|
| 2,343,656 | 3/1944 | Folberth et al. | 15—250.12 |
| 2,987,747 | 6/1961 | Oishei et al. | |
| 3,219,901 | 11/1965 | Foreman et al. | 15—250.12 XR |
| 3,148,399 | 9/1964 | Ziegler | 15—250.12 XR |
| 3,168,758 | 2/1965 | Oishei et al. | 318—443 XR |
| 3,333,174 | 7/1967 | Möller et al. | 318—443 |
| 3,335,352 | 8/1967 | Neapolitakis | 318—443 |
| 3,364,410 | 1/1968 | Foreman | 318—443 |
| 3,351,836 | 11/1967 | Kearns | 318—443 |

BILLY J. WILHITE, Primary Examiner

R. I. SMITH, Assistant Examiner

U.S. Cl. X.R.

318—443